US008069355B2

(12) United States Patent
Simeral et al.

(10) Patent No.: US 8,069,355 B2
(45) Date of Patent: *Nov. 29, 2011

(54) DATA PATH CONTROLLER WITH INTEGRATED POWER MANAGEMENT TO MANAGE POWER CONSUMPTION OF A COMPUTING DEVICE AND ITS COMPONENTS

(75) Inventors: Brad W. Simeral, San Francisco, CA (US); David G. Reed, Saratoga, CA (US); Dmitry Vyshetsky, Cupertino, CA (US); Roman Surgutchik, Sunnyvale, CA (US); Robert William Chapman, Mountain View, CA (US); Joshua Titus, Sunnyvale, CA (US); Anand Srinivasan, San Jose, CA (US); Hari U. Krishnan, Newark, CA (US)

(73) Assignee: NVIDIA Corporation, Santa Clara, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/342,865

(22) Filed: Dec. 23, 2008

(65) Prior Publication Data

US 2009/0150689 A1   Jun. 11, 2009

Related U.S. Application Data

(63) Continuation of application No. 11/305,816, filed on Dec. 16, 2005, now Pat. No. 7,487,371.

(51) Int. Cl.
*G06F 1/32* (2006.01)
(52) U.S. Cl. ........ 713/300; 713/310; 713/320; 713/321; 713/322; 713/323; 713/324; 713/340; 713/330

(58) Field of Classification Search .................. 713/300, 713/310, 320–324, 330, 340
See application file for complete search history.

(56) References Cited

U.S. PATENT DOCUMENTS

| 7,281,146 B2 | 10/2007 | Nalawadi et al. |
| 7,487,371 B2 * | 2/2009 | Simeral et al. ............. 713/300 |

OTHER PUBLICATIONS

Hewlett-Packard/Intel/Microsoft/Phoenix/Toshiba, "Advanced Configuration and Power Interface Specification", Revision 3.0, Sep. 2, 2004, pp. 1-602.

* cited by examiner

*Primary Examiner* — M Elamin
(74) *Attorney, Agent, or Firm* — Cooley LLP

(57) ABSTRACT

A data path controller, a computer device, an apparatus and a method are disclosed for integrating power management functions into a data path controller to manage power consumed by processors and peripheral devices. By embedding power management within the data path controller, the data path controller can advantageously modify its criteria in-situ so that it can adapt its power management actions in response to changes in processors and peripheral devices. In addition, the data path controller includes a power-managing interface that provides power-monitoring ports for monitoring and/or quantifying power consumption of various components. In one embodiment, the data path controller includes a power-monitoring interface for selectably monitoring power of a component. It also includes a controller for adjusting operational characteristics of the component for modifying the power consumed by the component to comply with a performance profile, which generally specifies permissible power consumption levels for the component.

19 Claims, 7 Drawing Sheets

DATA PATH CONTROLLER WITH INTEGRATED POWER MANAGEMENT TO MANAGE POWER CONSUMPTION OF A COMPUTING DEVICE AND ITS COMPONENTS

CROSS REFERENCE TO RELATED APPLICATION

This application is a continuation of U.S. application Ser. No. 11/305,816 now U.S. Pat. No. 7,487,371, filed on Dec. 16, 2005, which application is hereby incorporated by reference in its entirety.

BRIEF DESCRIPTION OF THE INVENTION

This invention relates generally to computing devices, and more particularly, to integrating a power management controller into a data path controller that facilitates communications among one or more processors and a variety of devices, including peripheral devices.

BACKGROUND OF THE INVENTION

Power requirements for computing devices have been increasing as they include a growing number of components that operate at higher speeds and data transfer rates, thereby drawing larger amounts of power. Many computing devices have implemented power management functions to manage the power consumption according to a particular configuration or application for the computing devices. While functional, traditional approaches to managing power have a variety of drawbacks, some of which are described next.

One approach to managing power is to mount a microcontroller or discrete logic onto a motherboard for regulating component power. A drawback to this approach is that it is relatively inflexible. In particular, this approach fixes both the power requirements of the computing device and its components at the time of manufacture. Further, this approach is relatively inflexible in that its power management capabilities are limited to processors and devices that were present when the motherboard was built. As a result, traditional power management techniques cannot readily manage the power of later-added processors and/or peripheral devices after the time of manufacturing. Another drawback is that motherboard manufacturers must generally dedicate space, power and interconnect lines to implement the microcontroller or discrete logic. Yet another drawback to this approach is that it does not provide input/output ports that can be configurable to monitor various kinds of peripheral devices that affect overall power consumption.

Another approach to managing power is to engage an operating system ("OS") of a computing device to manage power for the motherboard. This approach relies primarily on one or more processors as well as system memory to execute instructions of a power management algorithm. A drawback to this approach is that when the processor enters an idle state, it halts execution of instructions for all programs, including those related to OS-based power management. Accordingly, OS-based power management techniques cannot readily monitor and/or modify the activity levels of devices during the time the processor is idle. Activity levels of peripheral devices and power supply devices therefore cannot be assessed or acted upon when the power management algorithm is halted. Another drawback is that OS-based power management techniques burden the processor, thereby consuming processing cycles that otherwise would be used to perform other tasks. Further, this approach usually competes with other processor priorities to acquire processor cycles, thereby hindering power management resources from responding quickly to power-related events. As such, the power management resources remain latent while the processor performs other tasks. In some cases, the power-related events are unobservable by an OS-based power management system because the power-related events occur too quickly for the processor to detect, thereby foregoing opportunities to reduce power consumption. One example of an OS-based power management scheme is set forth in the Advanced Configuration and Power Interface ("ACPI") Specification, which is an open industry specification co-developed by various corporate entities.

In view of the foregoing, it would be desirable to provide a data path controller, a computer device, an apparatus and a method that minimizes the above-mentioned drawbacks, thereby facilitating power management by regulating operation of the components of a computing device, both individually and collectively.

SUMMARY OF THE INVENTION

Disclosed are a data path controller, a computer device, an apparatus and a method for integrating power management functions into a data path controller to manage power consumption of processors and peripheral devices. By embedding power management within the data path controller, the data path controller can advantageously modify its power management criteria in-situ so that it can adapt its power management actions in response to changes in processors and peripheral devices. In addition, the data path controller includes a power-managing interface that provides power-monitoring ports for monitoring and/or quantifying power consumption of various components. The data path controller can also offload power management functions that otherwise are performed by processor. This can decrease the response time to react to power-related events, especially noncompliant events. Further, embedded power management in a first mode can facilitate monitoring of activity levels as well as adjusting operational characteristics for reducing power consumption of components, for example, while the processor is in an idle state. In a second mode, embedded power management can proactively modify activity levels to bring them into compliance. Notably, the data path controller is a central component (or hub) through which most data communications for processors and peripheral devices pass. In one embodiment, the data path controller includes a power-monitoring interface for selectably monitoring power of a component. It also includes a controller for adjusting operational characteristics of the component for modifying the power consumed by the component to comply, for example, with a performance profile, which specifies permissible power consumption levels for the component. Generally, performance profiles balance various levels of performance (e.g., computational speed, etc.) against various levels of power consumption.

In one embodiment, the data path controller further includes a data store and a programming interface. The data store maintains the performance profile to govern operation of the processor and the peripheral devices. The programming interface modifies the performance profile to form a modified performance profile when another component is included in the components while the data path controller is coupled to the processor and/or the peripheral devices. As such, the controller can be configured to adjust operation of the new component in accordance to the modified performance profile. In some embodiments, the power-monitoring interface includes a plurality of general purpose interface signal ("GPIS") ports configured to monitor power during the exchange of data between the data path controller and the components. In some cases, the GPIS ports monitor activity levels of peripheral devices. In other cases, the GPIS ports can generate a sequence of events that affect power consumption of one or more components. Note that in one embodiment, the controller can be formed on a single substrate upon which the data path controller is formed. A substrate is any supporting material upon or within which an integrated circuit is fabricated. Silicon wafer or portion thereof (e.g., a die) is one example of a substrate.

In another embodiment, a method manages power consumption of a processor and devices at a data path controller, which forms data paths through input/output ("I/O") ports for facilitating data communications among the processor and the peripheral devices for a computing device. The method includes configuring a subset of the I/O ports as one or more power-monitoring ports to monitor power. It also includes monitoring activity levels of the devices and of the processor at the one or more power-monitoring ports to form monitored activity levels, detecting a noncompliant activity level of the monitored activity levels at the data path controller, and modifying the noncompliant activity level to modify power consumption of a device from the devices. Note that detecting the activity levels and modifying the activity level can be independent of the processor executing instructions for managing power of the device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1A:
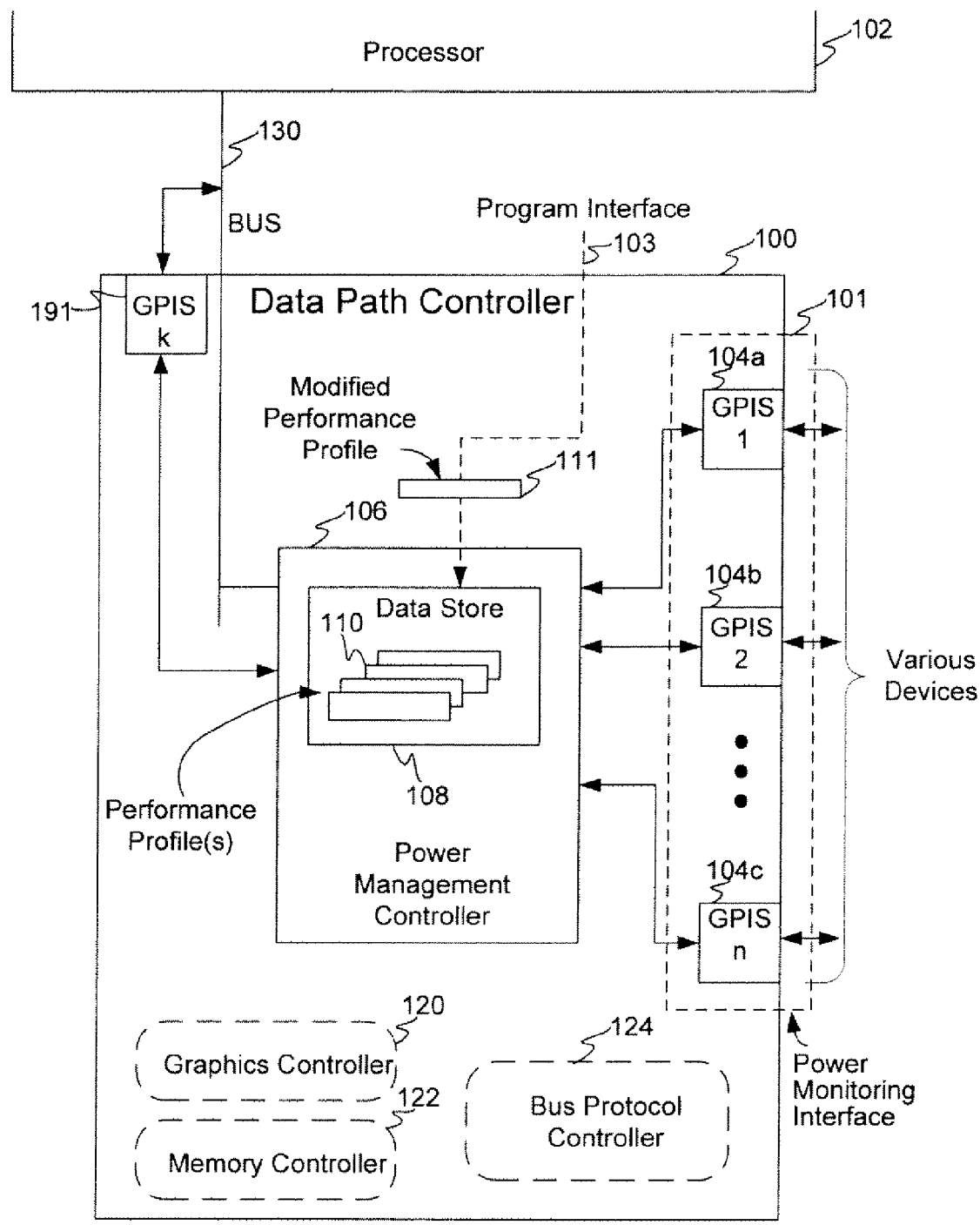
FIG. 1A is a block diagram of a data path controller with embedded power management for computing devices, according to at least one specific embodiment of the invention.

FIG. 1A is a block diagram of a data path controller with embedded power management for computing devices, according to at least one specific embodiment of the invention. Data path controller 100 resides in a computing device (not shown), and in most cases, on a motherboard. Conceptually, data path controller 100 forms data paths over which data are exchanged among components of a computing device. The term "component," in some embodiments, generally refers to either a processor, such as processor 102, or to any number of various devices (not shown) with which processor 102 communicates. Examples of such devices include peripheral devices (regardless of whether they are located external or internal to the computing device), such as graphics processing units ("GPUs"), hard drive controller devices, display drivers, and the like, as well as regulatory devices, such as voltage regulators or frequency/clock generators. Data path controller 100 includes a power management controller 106 and a power-monitoring interface 101 for selectably monitoring power of processors and peripheral devices. Specifically, power-monitoring interface 101 includes any number of general-purpose interface signal ("GPIS") ports 104a, 104b, and 104c. Advantageously, power management controller 106 is programmable in-situ so that it at any time can modify its power management criteria and methods with which it manages power, thereby adapting its power management actions to consider differing rates of power consumption due to additions, deletions, or substitutions of processors and peripheral devices. In addition, GPIS ports 104a, 104b, and 104c are power-monitoring ports that can be configured to monitor and quantify activity levels of a processor or a peripheral device for power management purposes. A GPIS port can also monitor and modify activity internal to either data path controller 100 or power management controller 106. For example, a GPIS port can provide clock clamping, frequency reduction/modification, and the like. As another example, GPIS port ("k") 191 can monitor activity associated with bus 130.

In accordance with at least one embodiment, data path controller 100 operates to manage power in at least two modes, both of which can be implemented separately or concurrently to manage power consumption for any component. In a first mode, data path controller 100 modifies operational characteristics of components to conserve power while providing sufficient resources to support a specific workload. This mode is generally reactive; it takes action to decrease power consumption, for example, as a result of low or negligible activity levels, such as experienced during an idle state. In a second mode, data path controller 100 modifies operational characteristics of components as corrective action to bring one or more noncompliant activity levels back into compliance. This mode is generally proactive; it takes action to decrease power consumption by decreasing activity levels of a component. As used herein, the term "operational characteristic," in some embodiments, describes a functional attribute of a component that can be controlled to alter the activity level of the component to adjust either its own power consumption or the power consumption of another component. As used herein, the term "activity level," in some embodiments, represents a quantifiable load associated with a component, where the amount of load correspondingly affects consumption of power by either that component or another component. An activity level can be expressed in any number of values, magnitudes or quantities. Said another way, an "operational characteristic" is an attribute that can be changed to alter the behavior of a component, whereas an "activity level" is measurable quantity that is indicative of how the component is behaving.

To illustrate the first mode of operation, consider that a bandwidth of a bus is an operational characteristic of one or more buses and can be controlled to either increase or decrease the size of the bandwidth. Further, consider that the amount of data passing over the bus at any given instance represents an activity level. Thus, data path controller 100 can manage power for a computing device by first monitoring the activity level of the bus (e.g., the data transfer rate of the bus), and then disabling (e.g., shutting down) components that have very low (i.e., negligible) activity levels to save power. So if the data rate is below some threshold (i.e., low amounts of data are passing over the bus), then data path controller 100 can either decrease (i.e., "throttle down") the bus width or shut down one or more bus controllers, thereby conserving power that would otherwise be expended by maintaining a higher bandwidth. Another operational characteristic is the ability of a disk controller to modify "access to a hard drive," with a corresponding activity level representing, for example, the "amount of disk accesses per unit time." Further to the illustration of the first mode, consider that during a first interval of time that a user applies a workload (e.g., runs a graphics-related application) to a computing device. The workload thus causes a bus and a hard drive to operate at relatively high activity levels (i.e., high bandwidths and large amounts of disk accesses). Since these components are needed to perform the workload, they are fully operational. During a next duration of time, however, the user shuts down the workload and lets the computer sit idle. Data path controller 100 monitors the activity levels during both of these intervals of time. So when it detects a drop to relatively low activity levels (or negligible activity levels) for both the bus and the hard drive, data path controller 100 can decrease the bus bandwidth and/or shutdown both the bus controller and the hard drive controller. Or, it can take some other action to reduce power consumption.

In the second mode of operation, data path controller 100 is configured to monitor select components to determine whether they individually or collectively consume a compliant amount of power, and if not, data path controller 100 can modify the behavior of one or more of the select components to meet a particular performance profile. A performance profile defines various performance criteria so that the select components operate to achieve a specific performance objective, such as performing high-speed computations, extending battery life, optimizing multimedia experiences, etc., while balancing power expenditures. Naturally, whether a computing device can meet a specific performance objective depends on the activity levels of its components as well as the rate at which power is being consumed to support those activity levels.

Again, data path controller 100 can adapt the manner in which it manages power consumption when new components are added to a computing device after the motherboard has been manufactured, unlike some conventional approaches in which power management of some later-added component might require a revision to the motherboard. Revisions to motherboards are costly and time-consuming. Moreover, GPIS ports 104*a*, 104*b*, and 104*c* provide a set of configurable power-monitoring input/output ("I/O") ports for selecting a component with which to evaluate while managing power for the computing device. These ports provide a relatively high-degree of flexibility to select which component that power management controller 106 will evaluate for managing power, without requiring modifications to a motherboard. Also, the embedded power management functionality of data path controller 100 advantageously enables it to perform power management functions that otherwise are done by processor 102. This conserves computational resources of processor 102, thereby freeing it to perform other tasks. In addition, data path controller 100 can monitor activity levels and/or adjust operational characteristics to manage power consumption of the components while processor 102 is in an idle state (e.g., it is in a sleep mode or otherwise is in mode that does not permit execution of power management instructions). This enables a more comprehensive management of power unlike operating system ("OS")-based power management algorithms that rely on processor 102 to execute instructions. Moreover, data path controller 100 is well suited to monitor and react to power-related events in real-time or (nearly so) without being limited by the priorities of processor 102. Namely, processor 102 performs many different tasks that an OS-based power management algorithm must compete against to acquire processor cycles (i.e., program execution cycles) for power management purposes. Consequently, the data path controller does not encounter the delays inherent with OS-based power management algorithms when monitoring activity levels to either modify operational characteristics in the first mode, or correct noncompliant power-related events in the second mode. In some embodiments, the term activity level is a quantity (or range of quantities) describing a measurable quantity for a particular activity or load. For example, a cooling fan operates with an operational characteristic of revolutions-per-minute, or RPM. A specific RPM expresses a level of activity that can be monitored to ensure some particular performance is maintained. So if a processor heats up during high speed operation, the RPM can be monitored and modified to ensure proper cooling. Note that in at least one embodiment, power management controller 106 can control aspects other than power consumption, such as the thermal characteristics of a component. If a component is running at or near temperatures that might damage it or the computing device, power management controller 106 can take appropriate corrective action to reduce the temperatures by, for example, increasing the RPM of a fan, throttling back clock frequencies, decreasing voltage level, and the like.

Power management controller 106 is configured to implement the power management functions, in whole or in part, for data path controller 100 as well as the computing device in which it operates. As part of its power management responsibilities, power management controller 106 determines the activity level at which a component (not shown) is operating and/or whether the component is operating within a compliant range of activity. First, power management controller 106 monitors the activity levels of the component, such as the data being exchanged between a component and data path controller 100. By monitoring an activity level, power management controller 106 can at least determine whether that particular component is operating in a suboptimal manner with respect to power conservation. In the second mode of operation, power management controller 106 compares that monitored activity level to a threshold activity level set forth in the performance profile. If the monitored activity level is in concert with the performance profile, then no action need be taken to alter the activity level as monitored. But if the monitored activity level falls out of compliance, then power management controller 106 initiates corrective action. In some cases, that corrective action can include modifying the behavior of the noncompliant component so that it complies with its threshold activity level. In other cases, power management controller 106 can recalibrate activity levels of other less essential components to compensate for the increased activity level of the noncompliant component, especially when the noncompliant component is essential to meet the performance objective defined by the performance profile. Such recalibration maintains an overall power consumption of the computing device compliant with a global activity threshold or watermark.

Power management controller 106 includes a data store 110 for storing one or more performance profiles. In at least one embodiment, data path controller 100 includes a programming interface ("program interface") 103 configured to reprogram data store 110 to update stored performance profiles 110 to include a modified performance profile 111. For example, consider that that a new peripheral device (e.g., a new hard drive controller) is added to the existing components after data path controller 100 is coupled to processor 102 on a motherboard (not shown). Advantageously, programming interface 103 enables in-situ reprogramming of data store 110 so that data path controller 100 can remain in its operational position, such as mounted on a motherboard, without being disconnect from processor 102. Note that each of performance profiles 110 relates to different performance configurations (e.g., high-speed, low power, etc.). In one embodiment, bus 130 is configured to implement programming interface 103.

In various embodiments, performance profiles 110 include activity level thresholds as, for example, upper limits, lower limits and/or one or more ranges. A performance profile can include a data structure that describes the operational characteristics that the select components should have to comply with a performance profile. Examples of operational characteristics include voltages, frequencies, data throughput on buses, etc. For example, consider that a particular bus can have three ranges of activity levels (e.g., light, medium and heavy traffic). Depending on the monitored activity level of that bus, power management controller 106 in the first mode can adjust the width of the bus to the appropriate activity level, as set forth in one of performance profiles 110. Unused links in the bus then can be tri-stated to reduce unnecessary power consumption. One example of such a bus is one that implements a Peripheral Component Interconnect Express, or "PCIe" bus architecture. In some embodiments, each of performance profiles 110 can also include an algorithm for identifying a hierarchy of components from least essential to most essential for a particular performance profile. Then, the algorithm can adjust operational characteristics to decrease the activity levels of the least essential components (i.e., positioned lower in a hierarchy) before modifying the activity levels of the most essential components (i.e., positioned higher in the hierarchy). For example, a GPU might have a lower hierarchical position for a performance profile that optimizes music playback by a CD-ROM drive. As such, power management controller 106 will consider the GPU a candidate for reducing its activity level (i.e., its graphics pipeline are not essential to the playback of just music). But in other performance profiles 110, such as those emphasizing video play-back, the GPU would have a higher position in the hierarchy. In this case, power management controller 106 will adjust activity levels of other components that are subordinate to the GPU when minimizing power losses. Note that in some embodiments, one or more of GPIS ports 104a, 104b, 104n, and 191 can be disposed either within power management controller 106 or external to data path controller 100, or both.

Figure 1B:
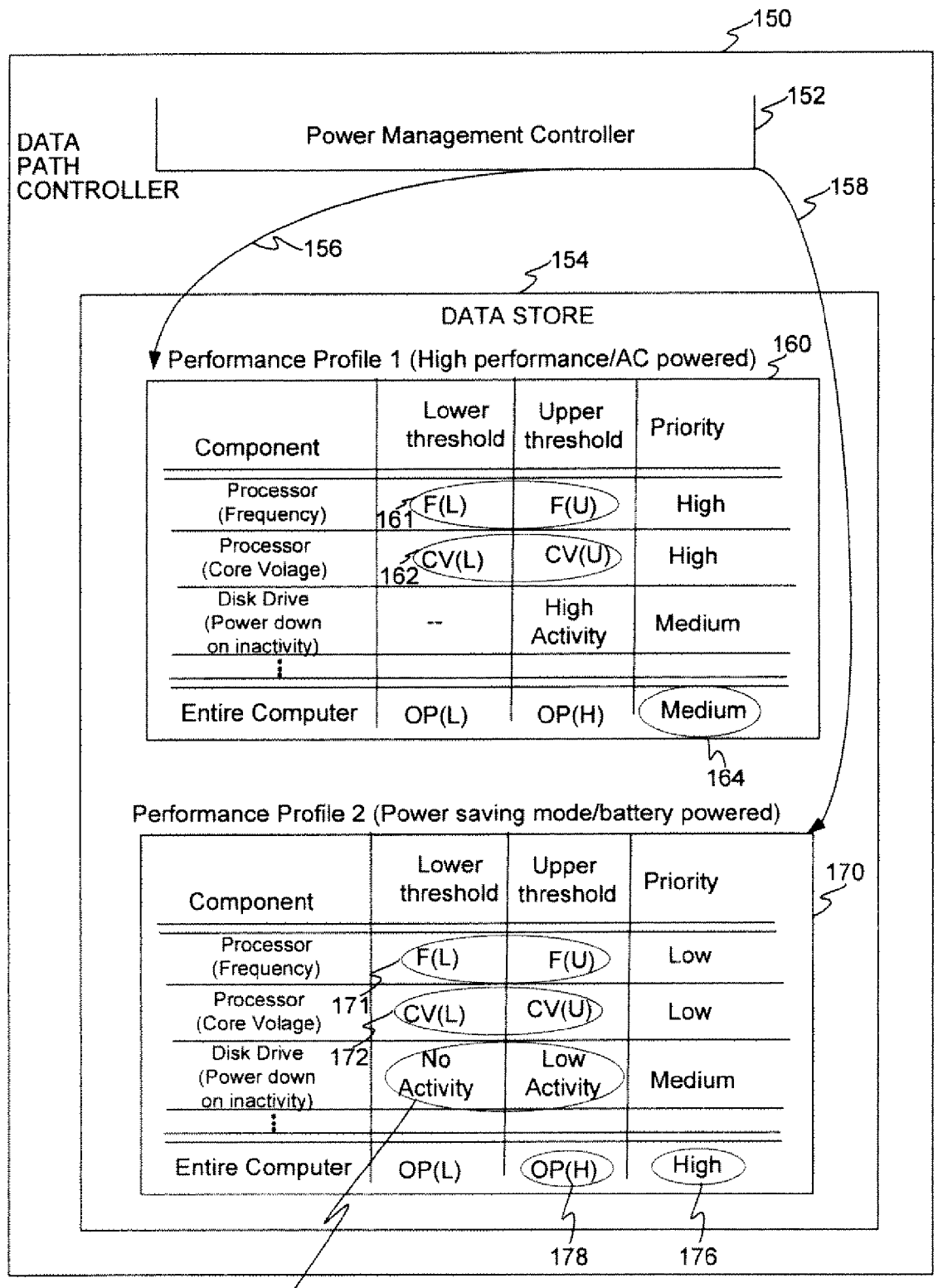
FIG. 1B is a block diagram depicting a power management controller managing power according to various performance profiles, according to at least one specific embodiment of the invention.

FIG. 1B is a block diagram depicting a power management controller managing power according to various performance profiles, according to at least one specific embodiment of the invention. Note that the number of components and performance profiles shown in FIG. 1B are merely for discussion purposes. Persons having ordinary skill the art should appreciate that any number of components and performance profiles can be used. Further, the use of priorities is optional in some embodiments, and therefore can be omitted. As shown, data path controller 150 includes power management controller 152 being operable to choose selection 156 as a first performance profile 160 or selection 158 as a second performance profile 170. In some embodiments, power management controller 152 chooses one of selections 156 and 158 automatically, based on usage of the computer. Data store 154 maintains both performance profiles 160 and 170. Here, performance profile 160 describes criteria for managing power when a computing device is AC-powered and is configured to perform in a high performance state (e.g., when performing multimedia tasks, including computationally-intensive graphics operations). By contrast, performance profile 170 describes criteria for managing power when a computing device is battery-powered and is configured to perform in a manner that conserves power and extends operational life of a battery. Notably, power management controller 152 can use performance profiles 160 and 170 (or any like profiles) for either the first mode or the second mode.

If a user wishes to operate a computing device at higher levels of performance, then power management controller 152 uses performance profile 160. That is, the user desires a higher performing computing device over one that minimizes power consumption (e.g., higher operating speeds are preferred over extending battery life). As such, performance profile 160 describes a range of frequencies 161 and a range of voltages for operating the processor at high-speeds, without necessarily conserving power. Range of frequencies 161 specifies processor operation between a lower frequency limit, F(L), and an upper frequency limit, F(U). Range of core voltages 162 specifies processor operation between a lower voltage limit, CV(L), and an upper voltage limit, CF(U). For this profile, the frequency values and core voltage values are generally high values to enable maximum performance (i.e., fastest instruction execution). Further, performance profile 160 specifies a "medium" priority 164 for operating the entire computer between a lower overall power consumption level, OP(L), and an upper overall power consumption level, OP(U). Since the computer has medium priority 164, power management controller 152 will not press to conserve overall power consumed by the computing device, unless, for example, thermal limits (not shown) of the profile are near noncompliant levels that might result in irreparable damage from excessive heating. The priorities of "high" for the frequencies and core voltages indicate that these operational characteristics are essential to the objective of profile 160. As such, power management controller 152 might consider modifying activity levels of devices having lower priorities, such as the disk drive, so that overall power consumption (or at the device level) to complies with profile 160.

But when power management controller 152 uses performance profile 170 to manage power, conserving power is relatively more important than performance. As such, performance profile 170 specifies that managing power consumption of the entire computer is a "high" priority 176. In particular, if the overall power consumption exceeds a power budget, or upper limit of OP(U) 178, then power management controller 152 will initiate power-conserving actions. For example, consider that the priorities of maintaining processor frequencies and core voltages within a first range 171 and a second range 172, respectively, are "low." Also, consider that range of activity 174 specifies hard drive activity (e.g., number of disk accesses per unit time) between a lower frequency limit, "no activity," and an upper frequency limit, "low activity." Power management controller 152 will shut down the hard drive if there is no activity to save power, whereas power management controller 152 will permit various amount of activity below an activity level threshold of "low activity," above which it institute power-conserving measures. Accordingly, if power management controller 152 detects that the disk drive is operating at lighter than a "low activity" (i.e., an activity level threshold), then to comply with power budget 178, power management controller 152 might vary the operational characteristics of the processor rather than forcing the disk drive to comply. For instance, the power management controller 152 can decrease the frequency and/or core voltages so that the power budget 178 is not exceeded. In this example, processor frequency and core voltage are "less essential" to meeting the objective of profile 170, which is conserving power, and therefore are more apt to have their operational characteristics changed. Note that when a device is added, removed or substituted on the motherboard, the data store can be reprogrammed to modify the process in which the power management controller manages power.

Figure 2:
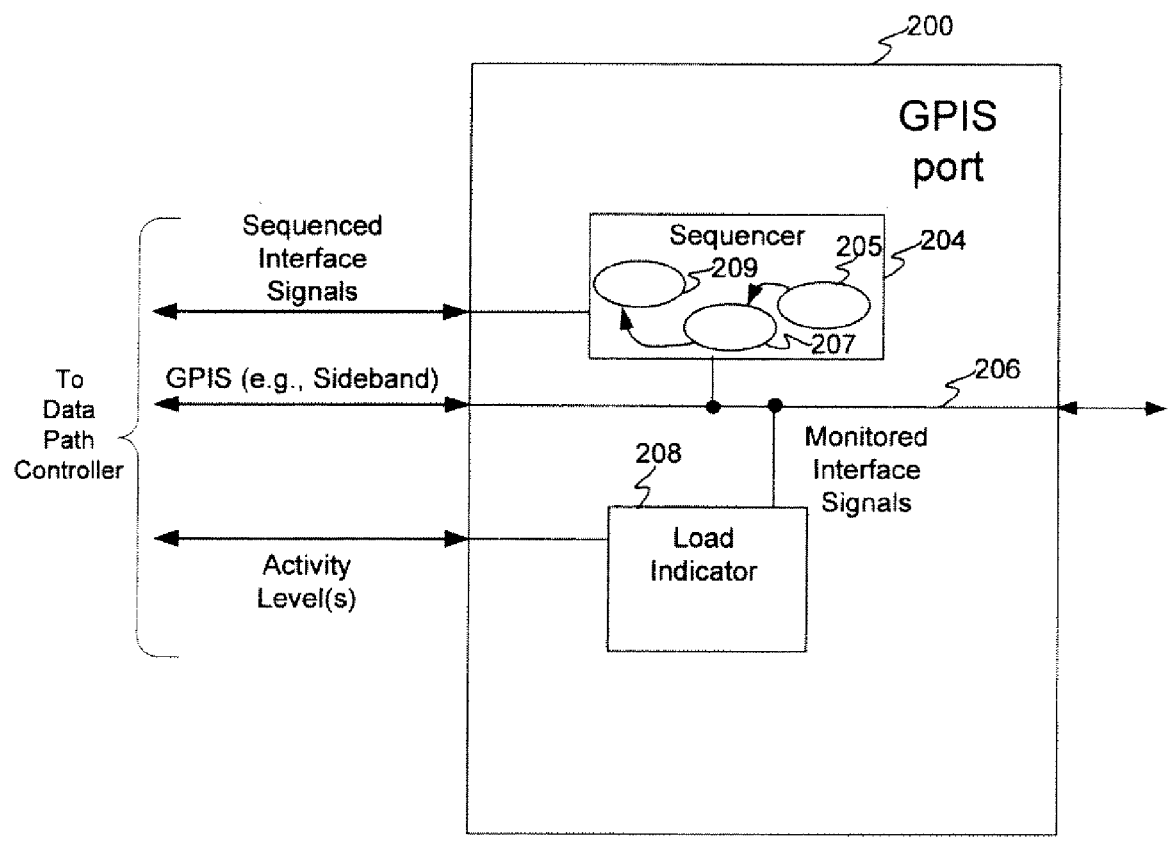
FIG. 2 is a functional block diagram of a general purpose interface signal ("GPIS") port, according to at least one specific embodiment of the invention.

Referring back to FIG. 1A, data path controller 100 also includes a number of general purpose interface signal ("GPIS") ports ("GPIS 1, GPIS 2, . . . GPIS n") 104a, 104b and 104c (collectively "104") so that power management controller 106 can selectably monitor and adjust operational characteristics of various components (not shown) during management of power. The adjustments to the operational characteristics can either place a component in a low activity state, such as during a first mode, or they can modify the activity levels to bring the component back into compliance, such as during a second mode. In some embodiments, GPIS ports 104 are configurable to selectably participate in the generation of feedback signals indicative of an activity level (or load) associated with the particular GPIS port 104. Then, the GPIS ports 104 send these feedback signals back to power management controller 106 for purposes of power management. FIG. 2 describes GPIS ports 104 in more detail. In various embodiments, data path controller 100 can include a graphics controller 120 for interacting with graphics devices via a PCI Express bus, for example. Note that graphics controller 120 can be integrated into data path controller 100, and thus need not require a PCI Express bus to communicate with graphics devices. Further, data path controller 100 can also include a memory controller 122 for controlling any kind of memory (graphics memory, system memory, etc) and a bus protocol controller 124 for controlling bus communications (e.g., over a PCIe bus or a USB). In one embodiment, graphics controller 120, memory controller 122, and bus protocol controller 124 collectively provide, in whole or in part, functionalities equivalent to Northbridge and/or Southbridge devices. For example, data path controller 100 can be configured to perform the Northbridge functions of controlling a processor, memory, Peripheral Component Interconnect ("PCI") buses, cache (e.g., Level 2 cache), and/or Accelerated Graphics Port ("AGP") activities. As another example, data path controller 100 can be configured to perform the Southbridge functions of various input/outputs ("I/Os"), such as USB, serial ports, audio signal ports, etc., and optionally an interrupt controller. In at least one specific embodiment, data path controller 100 can be formed on a single substrate (e.g., a semiconductor substrate). In some embodiments, data path controller 100 can cooperate with processor 102 to effectuate power management. For example, power management controller 106 can interact with an OS-based power management algorithm stored in program memory (not shown). As another example, processor 102 can select which of performance profiles 110 is to be used in managing power in response to the particular usage of the computing device.

FIG. 2 is a functional block diagram of a general purpose interface signal ("GPIS") port, according to at least one specific embodiment of the invention. As shown, GPIS port ("GPIS") 200 includes a sequencer 204, a straight-through path 206 and a load indicator 208. Load indicator 208 is configured to monitor interface signals to determine an activity level associated with a component communicating via GPIS port 200 with the data path controller. Generally, the activity level is indicative of the degree to which the associated component is busy (or active) or is not busy (or inactive), as well as any degree of activity between the two extremes. As such, the activity level can be expressed in any number of values, magnitudes or quantities. Load indicator 208 then communicates the activity level to a power management controller. To illustrate its operation, consider that load indicator 208 is coupled between a data path controller and a hard drive controller. When a number of read and write cycles are accessing a disk reaches a certain amount, then the disk is considered to have a relatively high activity level. But when accesses to the disk are minimal or nonexistent, then the activity level can be considered to be relatively low. Naturally, the higher the activity level of the disk, the more power it is consuming. Load indicator 208 conveys these activity levels to the power management controller so that it can initiate an appropriate response for a given performance profile and the corresponding rate of power consumption. Activity levels can be expressed in terms of operating characteristics associated with a component, such as voltage, frequency, temperature, bandwidth, or any other characteristic that is measurable and can be altered or adjusted to influence power consumption.

Sequencer 204 is configured to initiate a sequence of events from the data path controller to a corresponding component. Notably, sequencer 204 can sequence through a number of values for a particular operating characteristic. For example, consider that sequencer 204 is coupled to a voltage regulator for powering a processor (e.g., a CPU core voltage, or Vcore) in discrete increments. Thus, sequencer 204 can step through sequenced events 205, 207, and 209 to respectively increase the voltage in steps of 1.5 volts, 2.5 volts and 3.3 volts. Of course, other components can be powered up and down with sequencer 204. Also, sequencer 204 can step through various levels of backlighting for an LCD display. In at least one embodiment, sequencer 204 is configured to initiate the sequenced events at a modified clock rate (or modified data rate) that is different (e.g., higher or lower) than the clock at which the power management controller operates. For example, consider that sequencer 204 is configured to drive a data signal onto a bus, such as a front-side bus or some other bus, where the bus has a different data transfer rate than the clock rate of the power management controller. In operation, sequencer 204 can step up (or down) the data transfer rate for an amount of time during which sequencer 204 is transmitting data. In some cases, the power management controller can also operate at a relatively higher (or lower) clock rate with the step up or down in the data transfer rate. Note that sequencer 204 need not be limited to only performing sequencing from lower to higher rates (or vice versa). Sequencer 204 can provide a sequence for any type of activity. Further, it can be implemented in hardware should a task be too cumbersome to do in software or over a few number of wires. Generally, however, sequencer 204 (or any other element of GPIS port 200) can be implemented in hardware, software, or a combination thereof.

Straight-through path 206 is configured to couple a data path controller and/or power management controller to a component. Accordingly, straight-through path 206 provides a "sideband" connection that is a direct connection to a component (i.e., it does not pass through a configuration register space or over a backbone bus, such as a front-side bus) to provide a relatively fast change to an operating characteristic. Such a sideband connection can deliver a command signal to, for example, disable a clock, gate a clock, slow down/speed up a clock, tri-state an interface, among other things. In some cases, straight-through path 206 can provide a voltage identification value (e.g., VID) to a power supply for a certain CPU.

In one embodiment, a data path controller can include any number of sequencers 204, straight-through paths 206 and load indicators 208 irrespective of whether each implemented within a GPIS port 200. In at least one embodiment, a collection of GPIS ports 200 can be configured to interconnect with a single component.

Figure 3:
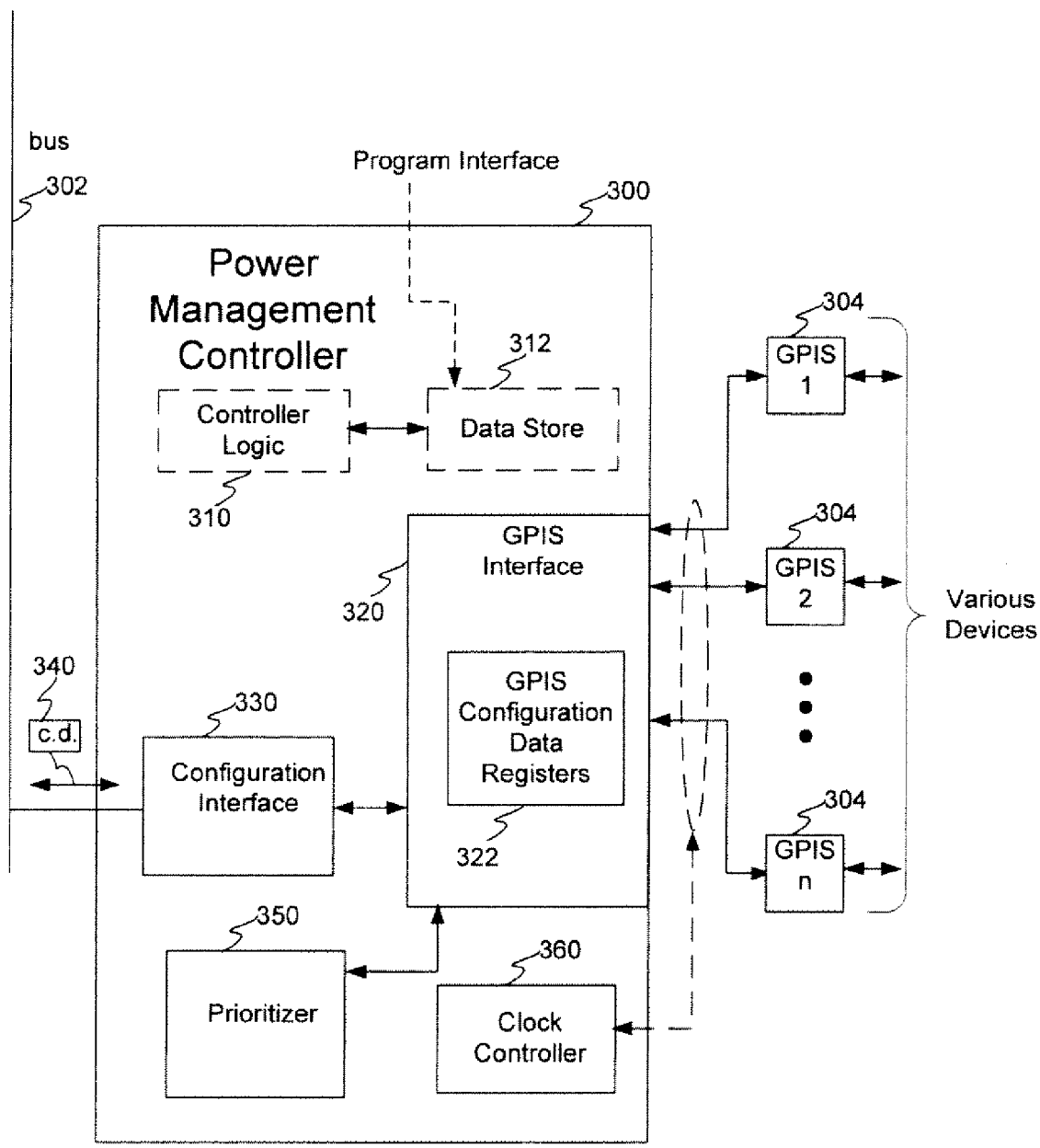
FIG. 3 is a functional block diagram of a power management controller, according to at least one specific embodiment of the invention.

FIG. 3 is a functional block diagram of a power management controller, according to at least one specific embodiment of the invention. Power management controller 300 includes controller logic 310 and data store 312, which is equivalent in structure and/or functionality as that of the same name in FIG. 1A. Controller logic 310 executes instructions to coordinate the functions of the elements within power management controller 300. In addition, power management controller 300 includes a GPIS interface 320, a configuration interface 330, a prioritizer 350 and a clock controller 360. Further, power management controller 300 is coupled to a bus 302 and to a number of GPIS ports 304.

GPIS Interface 320 is configured to interface each component coupled though GPIS ports 304 to exchange data signals and power management signals, such as activity levels and control signals to adjust operational characteristics to, for example, place components in a low activity state (i.e., an idle state), such as in a first mode of operation. In a specific embodiment, one or more GPIS configuration data registers 322 to maintain data representing values for monitoring activity levels (e.g., to monitor power consumption) and data representing values for controlling (or adjusting) operational characteristics for components. For instance, one of GPIS configuration data registers 322 can store data representing a thermal value that was either measured by a load indictor via a GPIS port 304 or received via configuration interface 330. In some cases, GPIS configuration data registers 322 are accessible by a processor (not shown) providing for an OS-based power management algorithm or for other purposes.

Configuration interface 330 is configured to access external configuration registers via bus 302 to either read or write configuration data ("c.d.") 340 with GPIS configuration data registers 322. Examples of external configuration registers accessible by configuration interface 330 are the ones in a memory space (e.g., a PCI memory space, or as memory-mapped I/Os) or those that are equivalent to PCI configuration registers in a PCI device. In some cases, bus 302 is a front side bus ("FSB"), whereas in other cases, bus 302 is a Hyper-Transport (e.g., a Lightning Data Transport, or LDT) link. In other cases, bus 302 represents a root of a standard PCI bus.

Clock controller 360 is configured to provide modified clocking (e.g., under-clocking) for data transport. In some cases, clock controller 360 modifies the clock of power management controller 300 to a higher performance state rather than modifying the clock rate of a sequencer to speed up the rate at which it transports data. Prioritizer 350 is configured to prioritize power-related events to which power management controller 300 responds. Generally, the hierarchical priorities set forth by prioritizer 350 are defined, in whole or in part, by a given performance profile. In one embodiment, prioritizer 350 is an interrupt controller and the priorities are realized as hierarchical interrupts.

Figure 4:
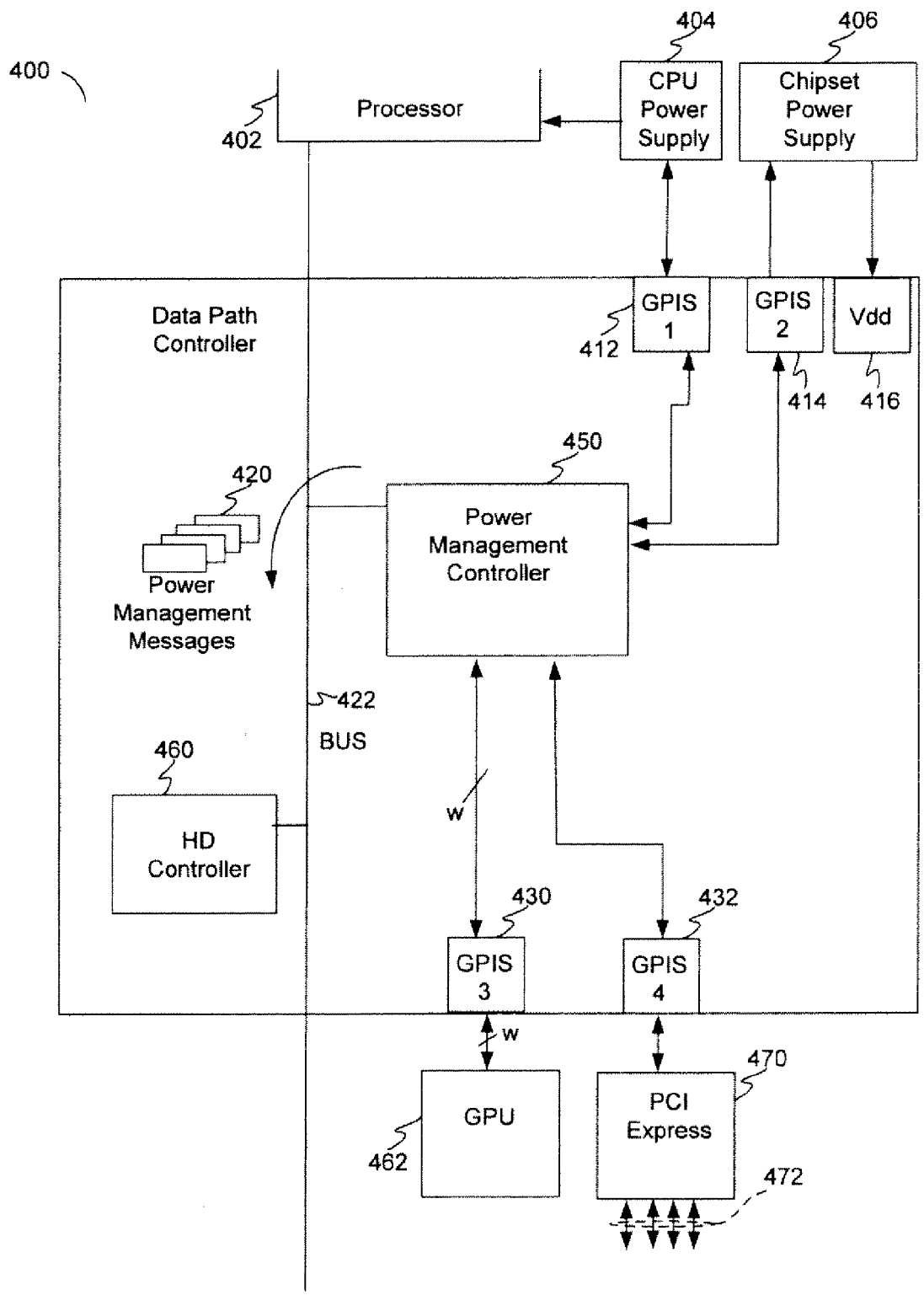
FIG. 4 is a block diagram illustrating an exemplary implementation of a power management controller, according to one embodiment of the invention.

FIG. 4 is a block diagram illustrating an exemplary implementation of a power management controller, according to one embodiment of the present invention. FIG. 4 shows a computing device 400 including a processor 402, a processor ("CPU") power supply 404, a chipset power supply 406, a data path controller 410, a hard drive ("HD") controller 460, a CPU 462 and a PCI Express bus controller 470. Note that in some embodiments, data path controller 410 can perform Southbridge functionalities. As such, hard drive controller 460 can be disposed within data path controller 410. Power management controller 450 is coupled to GPIS ports ("1") 412 and ("2") 414 to control power supply voltages generated by a process power supply 404 and chipset power supply 406, respectively. As shown, chipset power supply 406 is coupled to the power terminal ("Vdd") 416 of data path controller 410. As such, data path controller 410 can control the operational characteristics of its own power supply. To control power consumed by spinning disks of a hard drive, power management controller 450 can turn off the hard drive by sending one or more power management messages 420 via bus 422 to hard drive controller 460. Further, power management controller 450 can control the width, w, of a bus to GPU 462. For example, consider that GPIS ("3") port 430 represents a number of GPIS ports and power management controller 450 determines that a performance profile is directed toward listening to music from a CD-ROM. Accordingly, power management controller 450 can determine that GPU 462 is relatively non-essential for that performance profile. As such, power management controller 450 can reduce the bus width, w, to an appropriate size that matches the minimal use by GPU 462. Lastly, power management controller 450 can modify the width of a PCI Express bus controller 472 by sending control signals via GPIS ("4") port 432 to PCI Express bus controller 472. In at least one embodiment, controller 450 can also detect that CPU 462 is underutilized at one moment of time and can then adjust the width, w, accordingly. FIG. 4 merely represents some capabilities of data path controller 410 having embedded power management functions; many other implementations fall within the scope of the present invention.

Figure 5:
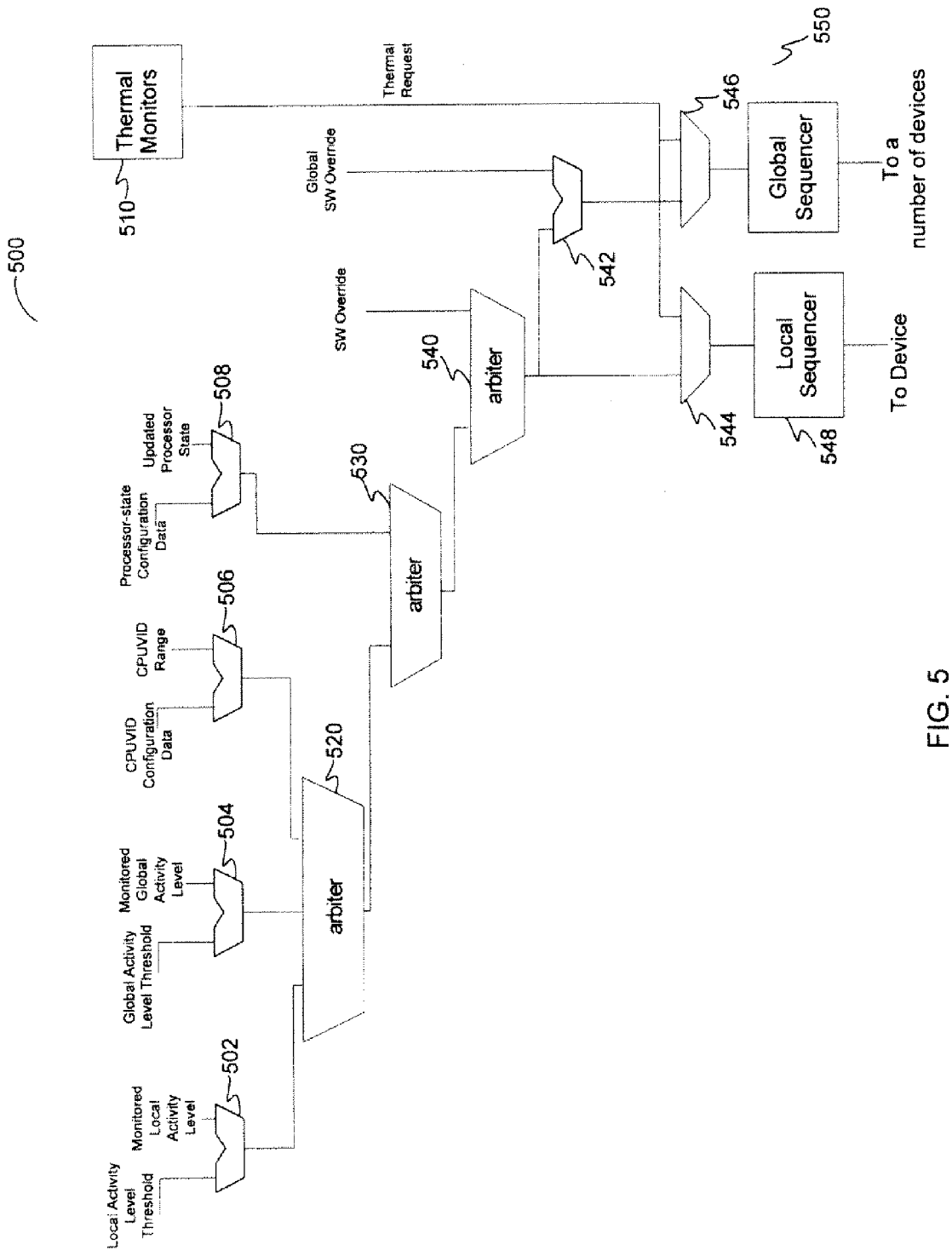
FIG. 5 depicts an exemplary flow for a power management controller in resolving power-related events, according to one embodiment of the invention.

FIG. 5 depicts an exemplary flow for a power management controller in resolving power-related events, according to one embodiment of the invention. As shown, comparator 502 compares a monitored local activity level for a specific component against its activity level threshold, and comparator 504 compares a monitored global activity level for a collection of components (e.g., those that constitute a computing device) against a global activity level threshold. A local activity level threshold is a threshold that represents an activity level that a single component cannot violate. A global activity level threshold represents a global maximum at which all local activity levels relating to the global maximum will operate. For example, consider that a power management controller is managing power consumed by two independent voltage planes, each of which includes a number of local load indicators for measuring the load locally. Next, consider that in one voltage plane there exists four local load indicators. Three are indicating that they require only 850 mV, whereas the fourth one requires 1.2 V. But to meet 1.2 V, all four local load indicators will be supplied with 1.2 V to ensure all voltage requirements are met. As such, 1.2 V is the global maximum.

Comparator 506 compares a measured processor voltage ("CPUVID configuration data") against a processor voltage range ("CPUVID range"). If any of comparators 502, 504 and 506 determine that a threshold has been surpassed, arbiter 520 then generates a signal that is fed into arbiter 530. The signal is indicative of the non-complying power-related event. Comparator 508 compares a current processor state ("processor-state configuration data") against an updated processor state to determine whether the processor state has changed. Arbiter 530 supplies a trigger to arbiter 540, which is configured to detect a software ("SW") override request generated by a processor (not shown) to override the performance (or the power consumption) of a single component. Comparator 542 determines whether a global SW override request is pending. A processor generates a global SW override request when a group of components are to have their operating characteristics modified to, for example, comply with a performance profile. Thermal monitors 520 are configured to generate a thermal request when a certain temperature is detected. Arbiters 544 and 546 will override any previously discussed actions if the temperature violates a threshold. But if there are no thermal requests, then arbiters 544 and 546 respectively supply local sequencer 548 and global sequencer 550 with a request to take actions to either minimize power consumption or place components in compliance with a performance profile. As is witnessed, thermal requests have higher priorities over global SW override requests, which are higher in priority than local SW override requests. Likewise, the local SW override requests are of a higher priority over the other monitored activity levels.

Figure 6:
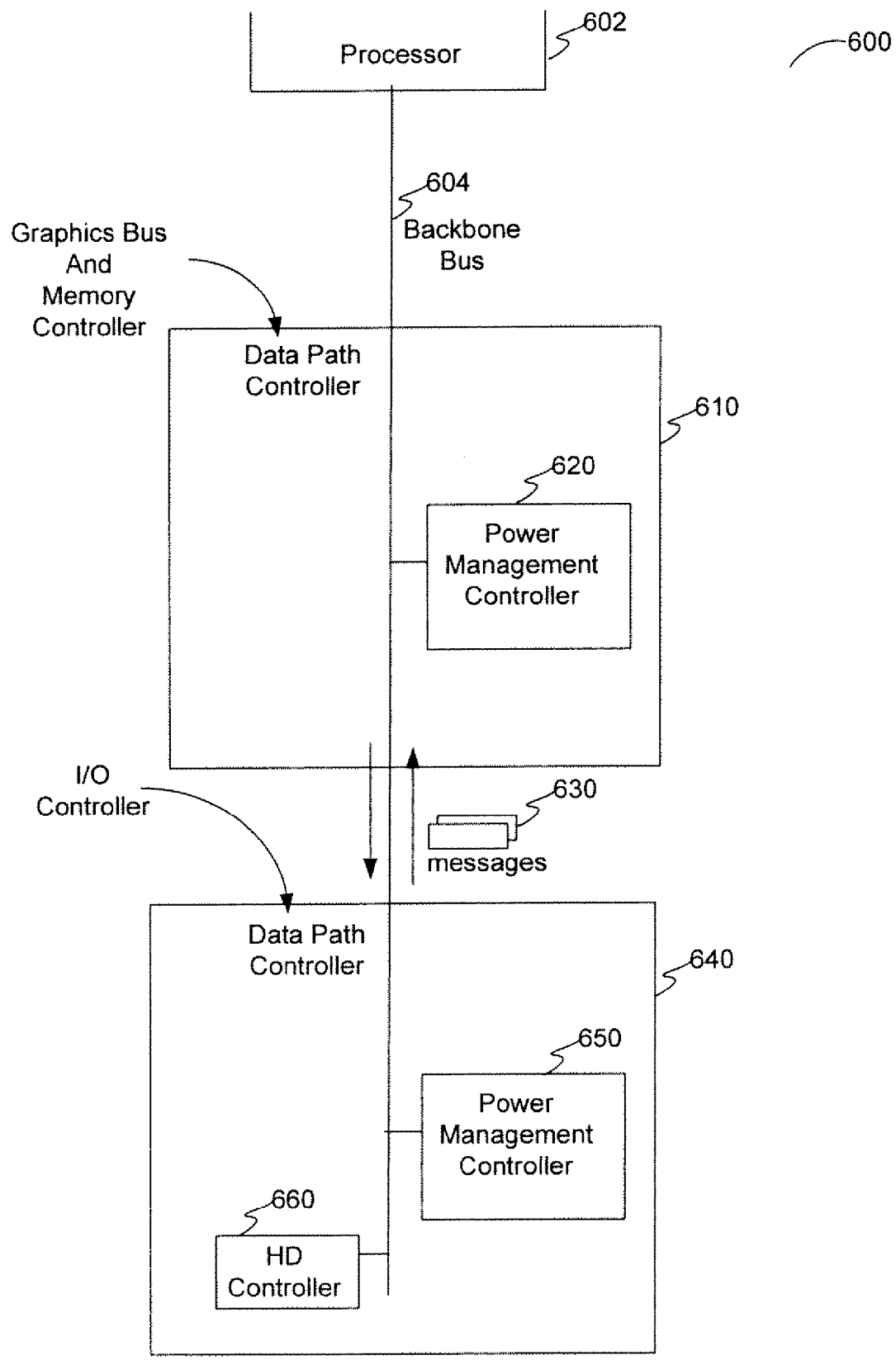
FIG. 6 is a block diagram depicting multiple data path controllers each including an embedded power management controller, according to another embodiment of the invention.

FIG. 6 is a block diagram depicting multiple data path controllers each including an embedded power management controller, according to another embodiment of the invention. As shown, diagram 600 depicts the structure and functionality of the previously discussed data path controllers being divided between two or more separate data path controllers. Namely, data path controller 610 includes a power management controller 620 and data path controller 640 includes a power management controller 650, with each power management controller having similar functionalities and structures as those described above. In this configuration of multiple data path controllers, a backbone bus 604 couples a processor 602 to data path controllers 610 and 640 for exchanging messages 630 for power management purposes. Note that backbone bus 604 can be implemented using other bus topologies, such as a hub and spoke topology. In one embodiment, data path controller 610 is configured as a graphics bus and an optional memory controller, and data path controller 640 is configured as an input/output ("I/O") controller. In some embodiments, data path controller 610 provides Northbridge functionalities and data path controller 640 provides Southbridge functionalities. As such, data path controller 640 can included hard drive ("HD") controller 660.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. For example, although the above descriptions of the various embodiments relate to power management, the discussion is applicable to controlling components regardless of power consumption considerations. In particular, alternative embodiments of the power management controllers described herein can modify performance levels of individual components to achieve a collective performance level for the computing device on the whole, without considering the power consumed to do so.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. A bridge having a data path controller to form data paths between a processor and peripheral devices, said data path controller having integrated embedded power management for controlling power consumed by the processor and the peripheral devices, said data path controller comprising:
   a power monitoring interface including an input/output ("I/O") port that monitors interface signals to determine an activity level associated with a peripheral device coupled to the I/O port by a variable width bus; and
   a power management controller receiving a report on the activity level from the power monitoring interface, the power management controller configured to adjust operational characteristics of said variable width bus for modifying power consumption by said variable width bus based on said activity level and a performance profile, wherein at least one power management function is offloaded from the processor to said bridge.

2. The bridge of claim 1 wherein the power management controller adjusts a bus width of said variable width bus.

3. The bridge of claim 2 further comprising a clock controller to modify a data rate at which data is transmitted from said data path controller via said variable width bus to form a modified data rate.

4. The bridge of claim 3 wherein said I/O port includes a sequencer to transmit a sequence of events at said modified data rate.

5. The bridge of claim 1 wherein said performance profile includes a global threshold to which said operational characteristics are collectively compared for determining a global maximum at which said operational characteristics will operate.

6. A bridge having a data path controller to form data paths between a processor and peripheral devices, said data path controller having integrated embedded power management for controlling power consumed by the processor and the peripheral devices, said data path controller comprising:
   a power monitoring interface including a plurality of general purpose interface signal ("GPIS") ports configured to exchange data between said data path controller and said processor and monitor interface signal activity levels; and
   a power management controller configured to adjust operational characteristics of at least one component coupled to said bridge based on the activity levels and a performance profile, wherein at least one power management function is offloaded from the processor to said bridge.

7. The bridge of claim 6 wherein said plurality of GPIS ports comprise a first subset of said GPIS ports including load indicators to convey activity levels associated with said processor and said peripheral devices.

8. The bridge of claim 6 wherein said power management controller is configured to adjust an operational characteristic of the component based on whether an activity level of a specified I/O port is non-compliant with a threshold.

9. The bridge of claim 6, wherein the bridge includes a clock controller to modify a data rate at which data is transmitted from said data path controller to form a modified data rate, and at least one GPIS port includes a sequencer to transmit a sequence of events at the modified data rate, the bridge selecting the modified data rate based on the performance profile.

10. The bridge of claim 6 further comprising a configuration interface configured to access configuration data in said processor or said peripheral devices, said configuration interface being configured to write configuration data to at least one of said processor and said peripheral devices to modify its operational characteristic.

11. The bridge of claim 10, wherein the operational characteristic comprises a processor frequency.

12. The bridge of claim 10, wherein the operational characteristic comprises a processor core voltage.

13. The bridge of claim 10, wherein modifying the operational characteristic comprises powering down one of the peripheral devices.

14. The bridge of claim 6 wherein the performance profile includes a global threshold to which said operational characteristics are collectively compared for determining a global maximum at which said operational characteristics will operate.

15. A bridge having a data path controller to form data paths between a processor and peripheral devices, said data path controller having integrated embedded power management for controlling power consumed by the processor and the peripheral devices, said data path controller comprising:

a power monitoring interface including a plurality of general purpose interface signal ("GPIS") ports configured to exchange data between said data path controller and said processor and to monitor interface signal activity levels; and a power management controller configured to adjust operational characteristics of at least one component coupled to said bridge based on the activity levels, wherein at least one power management function is offloaded from the processor to said bridge.

16. The bridge of claim 15 further comprising a configuration interface configured to access configuration data in said processor or said peripheral devices, said configuration interface being configured to write configuration data to at least one of said processor and said peripheral devices to modify its operational characteristic.

17. The bridge of claim 15 wherein the power management controller is configured to adjust the operational characteristics based on a global threshold to which said operational characteristics are collectively compared for determining a global maximum at which said operational characteristics will operate.

18. The bridge of claim 15, wherein at least one of the GPIS ports supports more than one data transfer rate, and the power management controller selects the data transfer rate.

19. The bridge of claim 15, wherein at least one of the GPIS ports is coupled to a variable width bus, the power management controller selecting the bus width.

* * * * *